US 8,259,360 B2

(12) United States Patent
Redmer

(10) Patent No.: US 8,259,360 B2
(45) Date of Patent: Sep. 4, 2012

(54) METHOD AND APPARATUS FOR CORRECTING GEOMETRIC ERRORS WHILE PRESERVING DEFINED INFORMATION

(75) Inventor: Eberhard Redmer, Ascheberg (DE)

(73) Assignee: Heidelberger Druckmaschinen Aktiengesellschaft, Heidelberg (DE)

(*) Notice: Subject to any disclaimer, the term of this patent is extended or adjusted under 35 U.S.C. 154(b) by 757 days.

(21) Appl. No.: 12/411,675

(22) Filed: Mar. 26, 2009

(65) Prior Publication Data

US 2009/0244591 A1 Oct. 1, 2009

(30) Foreign Application Priority Data

Mar. 28, 2008 (DE) ...................... 10 2008 016 312

(51) Int. Cl.
*G06T 5/00* (2006.01)
*G06K 1/00* (2006.01)
(52) U.S. Cl. ...................... 358/3.26; 358/1.9
(58) Field of Classification Search .......... None
See application file for complete search history.

(56) References Cited

U.S. PATENT DOCUMENTS

| 6,024,504 | A | * | 2/2000 | Weichmann et al. | ........... 400/61 |
| RE38,758 | E | * | 7/2005 | Bloomberg et al. | .......... 235/494 |
| 2007/0051265 | A1 | | 3/2007 | Schultze | |

FOREIGN PATENT DOCUMENTS

DE  10 2005 041 651 A1  3/2007
DE  197 24 066 B4  4/2007

* cited by examiner

Primary Examiner — Marivelisse Santiago Cordero
Assistant Examiner — Barbara Reinier
(74) Attorney, Agent, or Firm — Laurence A. Greenberg; Werner H. Stemer; Ralph E. Locher

(57) ABSTRACT

A method and an apparatus are provided for correcting geometric errors during a transfer of a printing image to a printing material. For the purpose of correction, a raster bitmap is fed to a matrix manipulation device, which distorts the raster bitmap. The problem with the distortion is that areas such as edge marks are also distorted. In order to avoid those undesired distortions, a protected area determining device for determining a protected area within the raster bitmap and/or the master print, and a protective element for preserving the content of a protected area within a raster bitmap, are provided.

11 Claims, 1 Drawing Sheet

METHOD AND APPARATUS FOR CORRECTING GEOMETRIC ERRORS WHILE PRESERVING DEFINED INFORMATION

CROSS-REFERENCE TO RELATED APPLICATION

This application claims the priority, under 35 U.S.C. §119, of German Patent Application DE 10 2008 016 312.0, filed Mar. 28, 2008; the prior application is herewith incorporated by reference in its entirety.

BACKGROUND OF THE INVENTION

Field of the Invention

The present invention relates to a method and an apparatus for correcting geometric errors during the transfer of a printing image to a printing material, in which at least one master print on which the printing image is based is set up, the master print is screened and at least one raster bitmap is produced. The raster bitmap is present in the form of a matrix with m lines and n columns, having elements which contain information about a color to be printed. The raster bitmap is manipulated through the use of matrix manipulation in such a way as to compensate for geometric distortions of the printed image on the printing material.

In reproduction technology, master prints which contain all of the elements to be printed, such as text, graphics and images, are produced for printed pages. In the case of the electronic production of the master prints, those elements are present in the form of digital data. In the case of an image, the data is produced, for example, by scanning the image point by point and line by line in a scanner, with each image point being broken down into color components and color values of those components being digitized. Images are normally broken down in a scanner into the color components red, green and blue (RGB). For four-color printing, those components are then further transformed into the printing colors cyan, magenta, yellow and black (CMYK).

In a further working sequence, the digitized text, graphics and images are mounted in a processing station, with visual monitoring on a color monitor or automatically in accordance with stored predefined layouts, to form a printed page. The printed page is then described in a data format, for example in the PostScript page description language, and stored. In order to produce a printing plate for each printing color, the printing page data is composed of color separation data for one of the printing colors CMYK in each case. The color separation data is recorded on film material or directly on printing plates at very high resolution by using a film or plate recorder. There are also digital printing presses which operate without printing plates. In that case, the color separation data is transferred directly to the digital printing press and printed out there on the printing material.

For recording on film material or printing plates, the color separation data is converted in a raster image processor (RIP) into high resolution bitmap data, with screen dots of different size being produced for the different density values of the colors. The result is a high resolution binary image having only two lightness values for each image point (black or white). In English usage, such an image is designated as "bitmap" or raster bitmap, whereas in specialist German it is also designated as "Strichbild".

The raster bitmap produced in that way is passed on to a printing plate exposer, where a printing plate is exposed on the basis of the information from the raster bitmap.

If the printing plate produced in that way is used in a printing press, ink is transferred from the exposed or the unexposed image points or pixels of the printing plate onto a printing material, depending on the type of printing plate being used.

In order to be printed, the printing material is led through an appropriate press nip, where the ink is applied to it. The more ink applied to the printing material, the moister the latter becomes and is distorted geometrically as it passes through various press nips. Geometric distortion occurs, as illustrated in FIG. 1. The printing material, for example paper, is distorted trapezoidally and, with it, the printed image applied to the printing material.

In order to compensate for those geometric errors, German Patent DE 197 24 066 B4, corresponding to U.S. Pat. No. 6,024,504, discloses feeding the raster bitmap to a matrix manipulation device, through the use of which the raster bitmap itself is distorted through matrix manipulation counter to the expected distortions of the printing material. In the matrix manipulation device, a geometric error correction is carried out through the use of individual functions which are applied to the matrix that represents the raster bitmap.

The problem with that distortion of the raster bitmap is that areas such as register crosses, printed sheet control strips or similar layout marks provided on the printing material are also themselves distorted by the manipulation of the raster bitmap. That change in the position and distortions of such areas can prove to be disadvantageous during the subsequent further treatment, such as during checking of the printed sheet control strips or of the register crosses, etc. In particular, the case of the edge marks of the printing plate should be emphasized. Those marks are needed in order to turn over the edge of the printing plate for its installation in the printing press. Since those marks are not printed but are based directly on the printing plate as such, corresponding distortions of those marks through the geometric correction of the bitmap lead directly to erroneous edge marks.

SUMMARY OF THE INVENTION

It is accordingly an object of the invention to provide a method and an apparatus for correcting geometric errors while preserving defined information, which overcome the hereinafore-mentioned disadvantages of the heretofore-known methods and devices of this general type and which at least reduce the problem of distorted subareas.

With the foregoing and other objects in view there is provided, in accordance with the invention, a method for correcting geometric errors during a transfer of a printing image to a printing material. The method comprises setting up at least one master print on which the printing image is based, screening the master print and producing at least one raster bitmap in the form of a matrix with m lines and n columns having elements containing information about a color to be printed, manipulating the raster bitmap by matrix manipulation to compensate for geometric distortions of the printed image on the printing material, defining protected areas in the master print and/or the raster bitmap, and maintaining the absolute position of all points and/or all elements within the protected area unchanged after the matrix manipulations have been carried out.

In each case it is ensured that the information within this protected area, in the final effect, is not adversely affected by the matrix manipulations, for subsequent use, either prior to, within the printing press or in a downstream process step.

With the objects of the invention in view, there is also provided an apparatus for correcting geometric errors during a transfer of a printing image to a printing material. The apparatus comprises a raster image processor for screening master prints and producing raster bitmaps, a matrix manipulation device for manipulating a raster bitmap present in the form of a matrix with m lines and n columns, and a matrix protection device including a protected area determining device for determining a protected area within the raster bitmap and/or a master print and a protective element for preserving a content of a protected area within a raster bitmap.

In accordance with another feature of the invention, the protective element is provided for preserving the absolute position of the content of the protected area within the raster bitmap.

It is therefore possible for a specific area to be chosen or determined through the use of the protected area determining device. The protective element ensures the preservation of this content, even if the raster bitmap as such is manipulated through the use of the matrix manipulation device, and in this way can ensure that the information from the raster bitmap within the protected area can also be unchanged after the manipulation and if appropriate used further at the same location.

In accordance with a further feature of the invention, in this case, the protection of the content of a protected area can be ensured by a second matrix manipulation which, within the partial matrix of the raster bitmap defined by the protected area, compensates for the manipulations of the first matrix manipulation.

In accordance with an added feature of the invention, for this purpose, provision is made for the protective element to include an appropriate matrix manipulation device for the renewed manipulation of the raster bitmap.

In accordance with an additional particularly advantageous feature of the invention, provision is made for the elements of a protected area of the raster bitmap to be copied into a temporary memory before the matrix manipulations, for the matrix manipulations to be applied to the entire bitmap and, after the matrix manipulations, for the content of the temporary memory or temporary buffer to be copied back to the original absolute position of the raster bitmap.

In accordance with yet another feature of the invention, for this purpose, provision is accordingly made for the protective element to include a memory device as a temporary memory for the temporary buffering or storage of the content of the protected area. Likewise, a writing device for rewriting the stored content into the protected area is provided, through the use of which the protected content is also written into the appropriate partial matrix again after the manipulations of the raster bitmap. In addition, a location memory is also provided, which provides the absolute position of the protected area. The absolute position of the protected area is in particular related to the plate origin of the printing plate or to the origin of the raster bitmap itself.

In accordance with yet a further feature of the invention, in order to avoid the information within the protected areas impairing the distortion of the raster bitmap within the matrix manipulation device, provision is particularly advantageously made to set the content of the protected area to zero or one after the copying into the temporary memory.

In accordance with yet an added feature of the invention, for this purpose, the protective element is accordingly provided with an erasing device which erases the content of the protected area by the latter being set to zero or one.

In accordance with yet an additional feature of the invention, the protected areas themselves can be determined or chosen from a set of possible stored protected areas. For this purpose, according to the invention, the protected area determining device includes a protected area memory, in which predefined protected areas are stored.

These protected areas can, for example, be the areas of the master prints or of the color separations which include print control strips, raster crosses, edge marks or the like.

In accordance with a concomitant feature of the invention, provision is made in terms of the apparatus for the protected area determining device to include a display device for displaying at least one area of a master print or of a raster bitmap and, in addition, to have a selection device for determining a protected area on the master print or the raster bitmap.

Through the use of this selection device, specific protected areas on the displayed and illustrated master print or raster bitmap can be chosen and are then protected accordingly during the matrix manipulation.

Other features which are considered as characteristic for the invention are set forth in the appended claims.

Although the invention is illustrated and described herein as embodied in a method and an apparatus for correcting geometric errors while preserving defined information, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
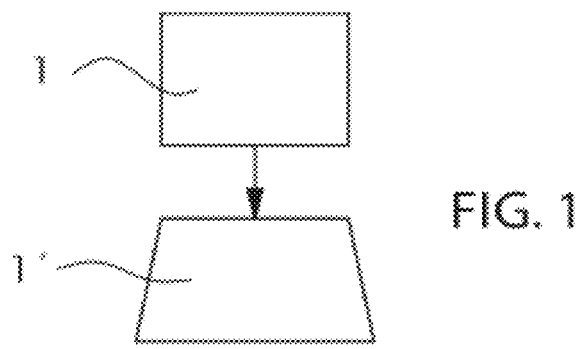
FIG. 1 is a diagrammatic, plan view showing a possible geometric distortion of a paper sheet.

Referring now to the figures of the drawings in detail and first, particularly, to FIG. 1 thereof, there is seen an example of geometric distortion of a paper sheet 1 as printing material.

An unprinted paper sheet 1 has a rectangular shape. When ink is applied and the paper sheet passes through one or more printing units, the paper sheet 1 becomes moist and is pressed out by press nips. A trapezoidal paper sheet 1' is produced in this way, as it passes through a non-illustrated printing press.

Further possible geometric errors of a printing material are explained in German Patent DE 197 24 066 B4, corresponding to U.S. Pat. No. 6,024,504, to which reference is hereby made.

Figure 2:
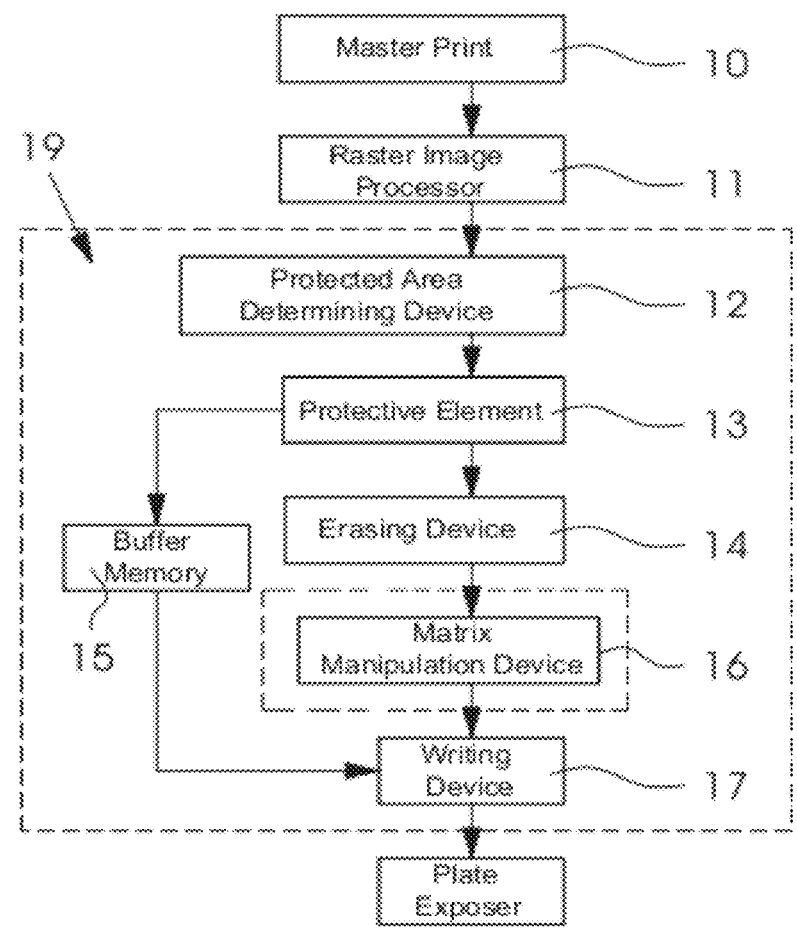
FIG. 2 is a flow chart of a geometric error correction preserving protected areas.

FIG. 2 illustrates a flow chart relating to a matrix manipulation of raster bitmaps, which illustrates geometric errors of a paper sheet 1' or of another printing material, while preserving the content of specific protected areas.

A master print 10 is produced in a pre-press stage. The master print is supplied to a raster image processor (RIP) 11, if appropriate as individual color separations, which are each assigned to a printing ink channel. In this raster image processor 11, the color separation, which for example can be present as a PDF in this case, is screened and converted into a corresponding raster bitmap. Depending on the areas of a printing form provided for the printing operation which are to be exposed, the raster bitmap is composed of a matrix with zeros and ones. In general terms, this matrix can also be multi-step, that is to say it can have more values than zero and one.

The raster bitmap produced in this way is a matrix composed of m lines and n columns. It corresponds substantially to the area of the printing plate to be imaged.

The raster bitmap produced in this way is fed to a matrix protection device 19. Firstly, the raster bitmap is fed to a protected area determining device 12. In this case, one or more protected areas can be chosen or created, for example by a user through a non-illustrated entry device. However, automatic assignment can also be provided in this case. The information produced in this way about the chosen protected area, if appropriate together with the raster bitmap, is transferred to a protective element 13. This protective element 13 stores the content of the protected areas in a buffer memory 15. The same applies to the position of the protected areas within the raster bitmap.

In a subsequent step, the raster bitmap is transferred to an erasing device 14, which erases the content of the protected areas. For this purpose, depending on the method used, the elements of the matrix within the specific protected areas are written with zeros or ones.

The matrix processed in this way, i.e. the raster bitmap processed in this way, is transferred to a matrix manipulation device 16. Within this matrix manipulation device 16, the raster bitmap is manipulated in such a way that geometric errors, such as have been described with regard to FIG. 1, for example, are compensated for in such a way that the printed image of the individual color separations lie one above another in correct register on the printed paper sheet 1'. The performance of these matrix manipulations is described in German Patent DE 197 24 066 B4, corresponding to U.S. Pat. No. 6,024,504, to which reference is hereby made.

This matrix manipulation in the matrix manipulation device 16 is carried out without taking the original content of the protected areas determined in the protected area determining device 12 into account.

The manipulated raster bitmap is then fed to a writing device 17. Depending on the stored locations of the determined protected areas and on the content of the protected areas which is stored in the buffer memory 15, this content is entered at the appropriate points in the raster bitmap, that is to say the manipulated matrix, in the writing device 17.

In the manner thus described, a raster bitmap is produced in which the printing images to be printed have been manipulated as a function of the geometric errors of the paper sheet 1' which have arisen, but the areas which do not belong to the printing image but rather are to be assigned to a specific protected area, such as an edge mark, have not been changed in terms of their content and, if appropriate, in terms of their positioning.

As described in German Patent DE 197 24 066 B4, corresponding to U.S. Pat. No. 6,024,504, the matrix manipulation includes, amongst other things, leaving out or newly adding specific image points or pixels of screen dots which are to be exposed on a printing form such as a printing plate. As a result, distortions of screen dots occur within a screen cell. Such distortions of individual screen dots can thus be avoided by way of the matrix protection device 19.

Another example is given in the case in which, for example, an edge mark is to be provided on the rear edge of a printing plate for a web-fed printing press. In this case, it is not a paper sheet 1' which is used as printing material but a paper roll. In this case, too, distortions of the printing material due to moisture occur. As a result of the correction of this geometric distortion, which also occurs in the case of a web-fed press, the edge mark of the printing plate would be displaced to a new position in relation to the printing plate origin. However, since this mark is not provided for use in the printing press but before that for use in a plate exposer, there are still no geometric distortions at all when this mark is used in the plate exposer. The applications thereto therefore definitively lead to errors. In order to avoid the position of this edge mark being located at different points for different color separations, this edge mark can be determined as a protected area. Bending over of the edge of the printing plates erroneously by using these marks can then be avoided. In this case, the determination of the protected areas can be carried out as early as during the production of the master prints 10 and can thus be taken into account at the start of the pre-press stage in order to then protect this specific area against distortion, at the end of the process chain, in the geometric error correction process.

The raster bitmap produced in this way can be transferred to a plate exposer 18. As described, through the use of the specific protected area, for example the edge marks for the printing plate always remain in the same position in this case in relation to the printing plate origin, without being distorted by the matrix manipulation device. The areas which are concomitantly printed in the printing press, and are thus also subject to the geometric error, can continue to be distorted, with the result that the geometric error can be compensated.

The invention claimed is:

1. A method for correcting geometric errors during a transfer of a printing image to a printing material, the method comprising the following steps:
setting up at least one master print on which the printing image is based;
screening the master print and producing at least one raster bitmap in the form of a matrix with m lines and n columns having elements containing information about a color to be printed;
manipulating the raster bitmap by matrix manipulation to compensate for geometric distortions of the printed image on the printing material;
defining protected areas in at least one of the master print or the raster bitmap;
maintaining at least one of all points or all elements within the protected area unchanged after the matrix manipulations have been carried out; and
compensating for the matrix manipulations which would lead to changes in a position of at least one of the points or of the elements within the protected area by second matrix manipulations locally within a partial matrix of the raster bitmap defined by the protected area.

2. The method according to claim 1, which further comprises maintaining an absolute position of a content of the protected area in relation to an origin of the raster bitmap or to a printing form to be used.

3. A method for correcting geometric errors during a transfer of a printing image to a printing material, the method comprising the following steps:
setting up at least one master print on which the printing image is based;
screening the master print and producing at least one raster bitmap in the form of a matrix with m lines and n columns having elements containing information about a color to be printed;

manipulating the raster bitmap by matrix manipulation to compensate for geometric distortions of the printed image on the printing material;

defining protected areas in at least one of the master print or the raster bitmap;

maintaining at least one of all points or all elements within the protected area unchanged after the matrix manipulations have been carried out; and before the matrix manipulation, copying all of the elements of the protected area of the raster bitmap into a temporary memory, applying the matrix manipulations to the entire raster bitmap and, after the matrix manipulations, copying the content of the temporary memory to the original absolute position of the raster bitmap.

4. The method according to claim 3, which further comprises setting the content of the protected area to zero or one after the step of copying into the temporary memory.

5. The method according to claim 1, which further comprises determining or choosing a protected area from a set of possible stored protected areas.

6. The method according to claim 1, which further comprises displaying at least one area of the master print or of the raster bitmap on a display device, and choosing a protected area in the master print or the raster bit map with a selection device.

7. An apparatus for correcting geometric errors during a transfer of a printing image to a printing material, the apparatus comprising:

a raster image processor for screening master prints and producing raster bitmaps;

a matrix manipulation device for manipulating a raster bitmap present in the form of a matrix with m lines and n columns; and a matrix protection device including a protected area determining device for determining a protected area within at least one of the raster bitmap or a master print and a protective element for preserving a content of a protected area within a raster bitmap, said protective element being configured for preserving an absolute position of the content of the protected area within the raster bitmap or in relation to an origin of a printing form to be used, the manipulation by said matrix manipulation device being an initial manipulation, said protective element including another matrix manipulation device for renewed manipulation of the raster bitmap, and said other matrix manipulation device acting on the raster bitmap in such a way that a content and an absolute position of a protected area after said initial manipulation and said renewed manipulation correspond to a position and a content before said initial manipulation.

8. The apparatus according to claim 7, wherein said protective element has a memory device acting as a temporary memory for temporary storage of a content of a protected area, a writing device for rewriting the stored content into the protected area after manipulation of the raster bitmap by said matrix manipulation device, and a location memory for storing an absolute position of the protected area.

9. The apparatus according to claim 8, wherein said protective element includes an erasing device for erasing the content of the protected area and setting the content of the protected area to zero or one after it has been copied into said temporary memory.

10. The apparatus according to claim 7, wherein said protected area determining device includes a protected area memory in which predefined protected areas for selection and application to at least one of the master print or the raster bitmap are stored.

11. An apparatus for correcting geometric errors during a transfer of a printing image to a printing material, the apparatus comprising:

a raster image processor for screening master prints and producing raster bitmaps;

a matrix manipulation device for manipulating a raster bitmap present in the form of a matrix with m lines and n columns; and a matrix protection device including a protected area determining device for determining a protected area within at least one of the raster bitmap or a master print and a protective element for preserving a content of a protected area within a raster bitmap, said protective element being configured for preserving an absolute position of the content of the protected area within the raster bitmap or in relation to an origin of a printing form to be used, said protected area determining device including a display device for displaying at least one area of a master print or of a raster bitmap and at least one selection device for determining a protected area on the master print or the raster bitmap.

* * * * *